May 1, 1962  Y. C. KIM  3,032,660
RANGE FINDER AND TRACKING DEVICE
Filed Dec. 17, 1959  6 Sheets-Sheet 1

INVENTOR.
YOUNG C. KIM
BY Darby & Darby
ATTORNEYS

May 1, 1962  Y. C. KIM  3,032,660
RANGE FINDER AND TRACKING DEVICE
Filed Dec. 17, 1959  6 Sheets-Sheet 3

INVENTOR.
YOUNG C. KIM
BY
Darby & Darby
ATTORNEYS

United States Patent Office 3,032,660
Patented May 1, 1962

3,032,660
RANGE FINDER AND TRACKING DEVICE
Young C. Kim, Carlstadt, N.J., assignor, by mesne assignments, to Fairchild Camera and Instrument Corporation, Syosset, N.Y., a corporation of Delaware
Filed Dec. 17, 1959, Ser. No. 860,205
3 Claims. (Cl. 250—83.3)

This invention relates to a direction finder, and more particularly to its use as a range finder and target tracker.

Many types of direction finders are known, their operation depending upon light, sound, radio waves, radar, infrared, etc. The use of infrared is becoming ever more important, because of its many inherent advantages. One of these advantages is that an infrared system is "passive," that is, it operates from rays emitted by the target, as for example the heat from power houses, rockets, missiles and jet planes, rather than from signals sent out by the finder and reflected from the target. Passive systems are more difficult to "jam," and are therefore more desirable. Additionally the presence of an infrared source is easily detected.

My invention contemplates the use of a semiconductor having the characteristics of producing a lateral voltage. I image the target on the semiconductor, and use the resultant lateral voltage to either track the target or determine its range.

This newly discovered characteristic of semiconductors is discussed in "A New Semiconductor Photocell Using Lateral Photo Effects," by Joseph Wallmark, page 474 of the April 1957 "Proceedings of the I.R.E." This article discloses that energy imaged on a semiconductor produces both a lateral voltage and a transverse voltage.

It is therefore the principal object of my invention to provide an improved range finder and tracker.

It is another object of my invention to provide a range finder and tracker using a semiconductor.

The attainment of these objects and others will be realized from the following specification, taken in conjunction with the drawings in which, FIG. 1 shows a plan view of a semiconductor arranged with tabs spaced at 90° intervals around the periphery thereof;

FIG. 2 is a sectional view taken along the line 2—2 of FIG. 1;

FIG. 3 indicates the output voltage of the semiconductor of FIGS. 1 and 2 with respect to two of the tabs;

Figure 1:
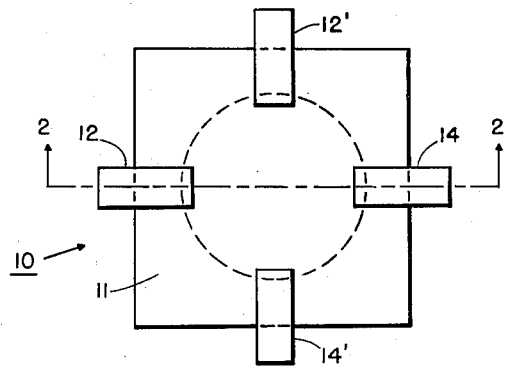
Figure 2:
Figure 3:
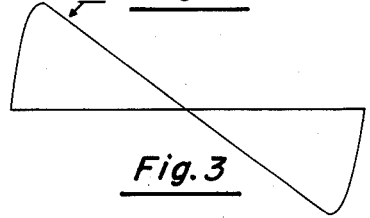

The lateral voltage concept may be better understood by referring to FIGS. 1 and 2 which show an enlarged semiconductor 10 comprising a base 11, base tabs 12 and 14, a second set of base tabs 12' and 14' at right angles to the first set, a junction area 15 and an indium dot 16. When excitation strikes the point exactly midway between tabs 12 and 14 for instance, there is no lateral voltage developed between tabs 12 and 14, this "null" position being called the "optical axis" of the semiconductor. As the point of excitation moves, an instrument connected between the tabs indicates a lateral voltage, and this lateral voltage changes in amplitude and polarity. As the exciting spot moves in one direction, it produces an increasingly positive lateral voltage, while movement in the other direction produces an increasingly negative lateral voltage. This relation is shown in FIG. 3 by curve 18 which is a chart of lateral voltage against location of excitation. The center portion of the curve 18 is very linear; and very small movements, less than 100 angstrom units, of the excited spot can be detected.

My invention will now be explained by use of FIG. 4, which shows a semiconductor of the above type and a target 20 that is on the optical axis. Rays from target 20 pass through an optical system 22, and are imaged upon the optical center of semiconductor 10. The lateral voltage is therefore zero. As the target moves off the optical axis its image will also move, and a lateral voltage will then be produced. This voltage is applied to a detector 24, which thereupon energizes a servo system 26 that repositions the optical element and/or the semiconductor to reestablish the null reading. Alternatively, one may use the teachings of the above article, i.e., that a D.C. potential applied between tabs 12 and 14 shifts the position of waveform 18 and is thus equivalent to pivoting the semiconductor. The potential or the movement necessary to reestablish a null reading is readily measured. In this way, the target is tracked, and suitable instruments can indicate the movement of the target and project its course.

Figure 4:
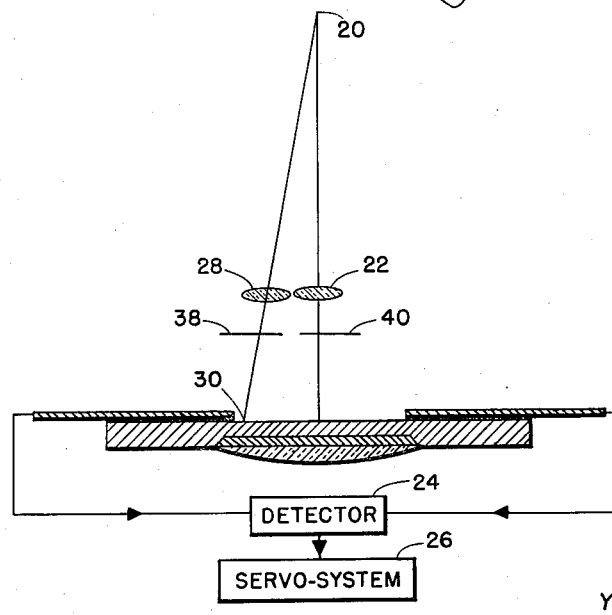
FIG. 4 illustrates the one form of my invention.

In order to use my invention as a range finder two beams from the target are required, and are shown in FIG. 4. The target is tracked as above, a second optical system 28 meanwhile imaging rays from target 20 at another point 30. The lateral voltage produced by spot 30 is an indication of its position and therefore of the angle between the rays entering the two optical systems. This angle and therefore the range, may be found by the usual methods of triangulation.

In order to assure separation between the signals caused by the rays in the separate paths, light choppers, indicated symbolically by the reference characters 38 and 40, are introduced. These may be apertured wheels, vibrating members, etc., and cause the two lateral voltages to have different characteristic frequencies. The frequency distinction permits the use of sensing circuits in detector 24 to treat each voltage independently of the other.

Figure 5:
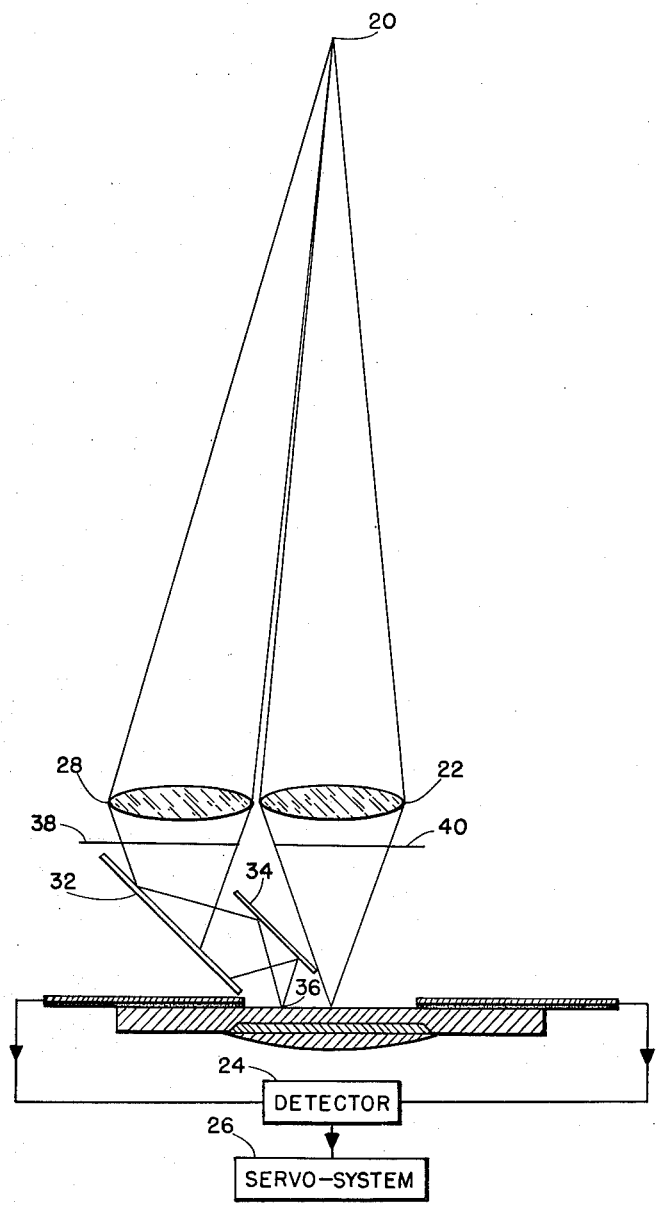
FIG. 5 illustrates a slightly different embodiment of the invention of FIG. 4 in which mirrors are utilized to expand the base line when used in ranging.

The accuracy of the ranging improves with larger angles between the rays entering the optical system, and since the size of the semiconductor of FIG. 4 has been exaggerated, FIG. 5 shows a practical arrangement that provides greater accuracy. In this case, the optical systems are further apart than the actual physical dimensions of the indium dot. Mirrors are now used to position the exciting spots on the semiconductor. The light from optical system 28 is now reflected from a first mirror 32 to a second mirror 34 that images the radiation at spot 36. For efficiency, it is desirable that mirror 34 be large; but compactness may cause it to intrude upon rays in optical system 22. In this case, mirror 34 may be semi-transparent so that the light from optical system 22 will also pass therethrough.

In the arrangements of FIGS. 4 and 5, the rays from optical system 22 are used to track the target, while the rays from the other optical system are used for ranging.

Figure 6:
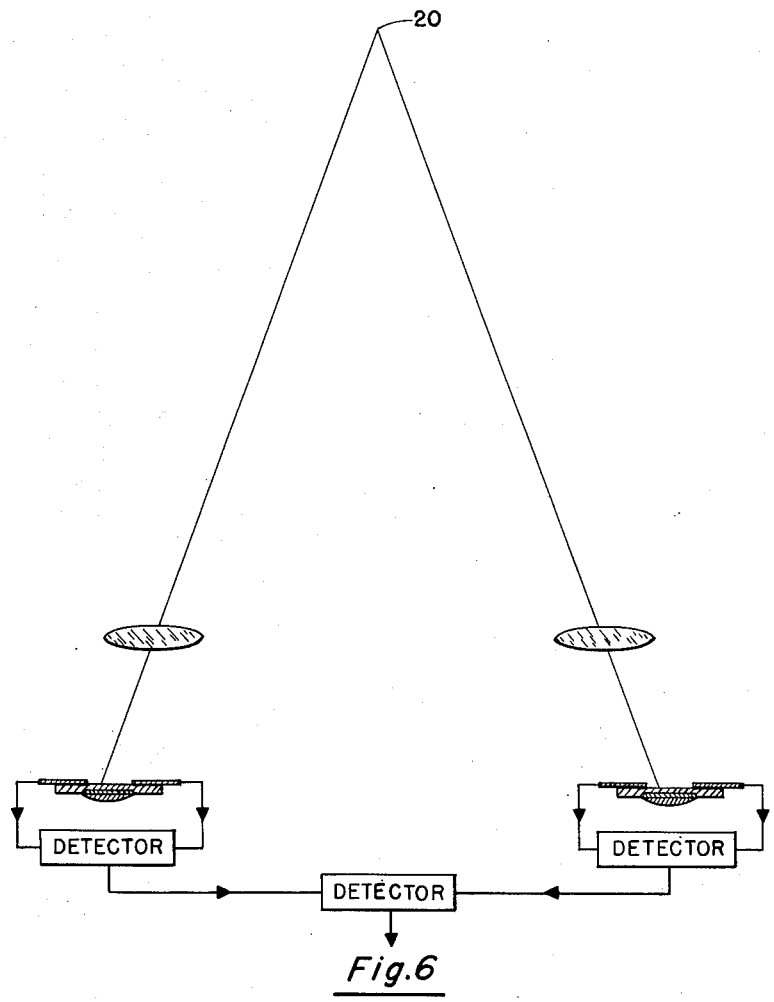
FIG. 6 illustrates an embodiment for obtaining ranging without the use of choppers.

As has been explained, greater accuracy results from rays having a larger angle between them. FIG. 6 shows another arrangement wherein separate semiconductors may be spaced as far apart as desired. In the embodiment shown in FIG. 6, it is not necessary for either semiconductor to be aimed directly at the target, or to use light choppers. Each semiconductor produces its own lateral voltages, which establish the relative direction of the target. Again, the usual well known methods of triangulation may be used to establish the range.

Figure 7:
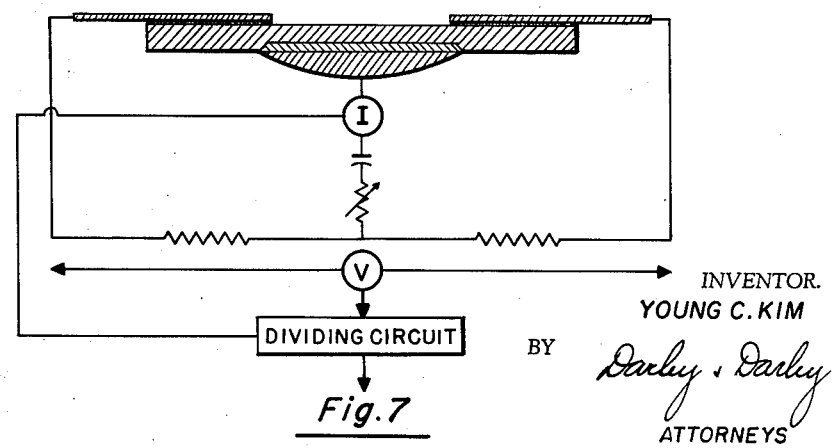
FIG. 7 illustrates a circuit used to overcome certain possible ambiguities present in the arrangements of FIGS. 4, 5, 6 and 8.

As has been shown, when the exciting spot moves closer to a base tab, the lateral voltage increases. It is also known that the lateral voltage also increases as the intensity of the radiation increases. In order to separate these two effects, the circuit of FIG. 7 may be used. In this circuit, when impinging radiation increases, (a) the lateral voltage between the tabs increases, and (b) the transverse current across the semiconductor also increases.

This circuit operates as follows: assume that the instantaneous values of the lateral voltage and transverse current are V and I, respectively. Suppose the radiation intensity of the target increases, as might happen if the target were joined by another, or ignited additional boosters. Under this condition, the positions of the exciting spots remain the same. The lateral voltage may now double to 2V. This may be erroneously interpreted to mean the target has moved to another position that has moved the exciting spot to a new location that produces twice the lateral voltage. With the circuit of FIG. 7, however, the transverse current also doubles, to a value of 2I. If the original lateral voltage V has been divided by the original transverse current I, the result would have been $V/I$. If the new voltage values are similarly divided, $2V/2I=V/I$, which is the same value as previously obtained. This constant quotient would indicate that the increase in lateral voltage is due to increased radiation, rather than a new position of the target.

Figure 8:
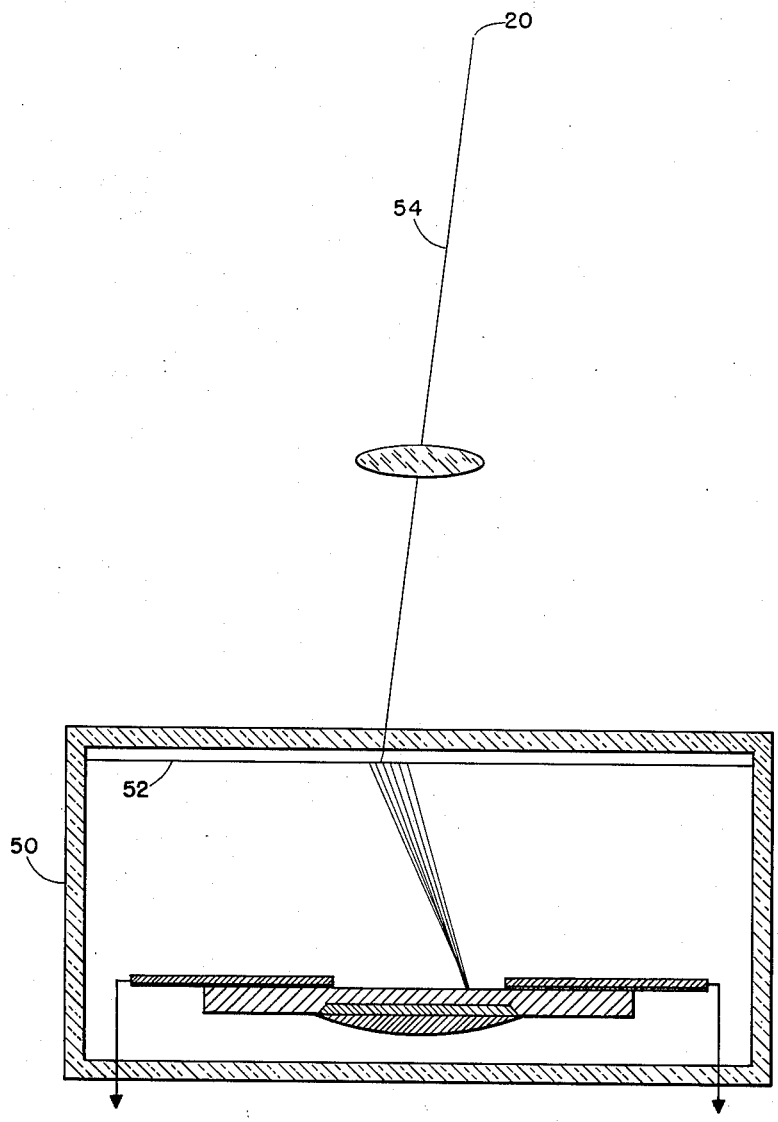
FIG. 8 illustrates an embodiment used when the impinging rays are extremely weak.

It will be understood that the impinging radiations are very weak when the target is small, distant, etc. The embodiment shown in FIG. 8 overcomes this condition by means of an image converter type tube. This is an evacuated envelope 50 having a photocathode 52 and a semiconductor of the type under discussion. The rays 54 are imaged on the photocathode, and the electrons emitted by the photocathode are accelerated and focused to bombard a corresponding point of the semiconductor. In this way, weak radiations may be used to provide intense electron bombardment of the semiconductor, and thus produce larger lateral voltages than previous embodiments. Photocathodes having suitable spectral response characteristics are used for the various types of radiation.

The foregoing discussion has considered the use of two base tabs, and the lateral voltages have therefore indicated right-left movements of the target. The above article describes a semiconductor having two sets of tabs, each set perpendicular to the other. This arrangement may be readily incorporated into each embodiment of my invention, which will then give three-dimensional indications of a target's position.

Figure 9:
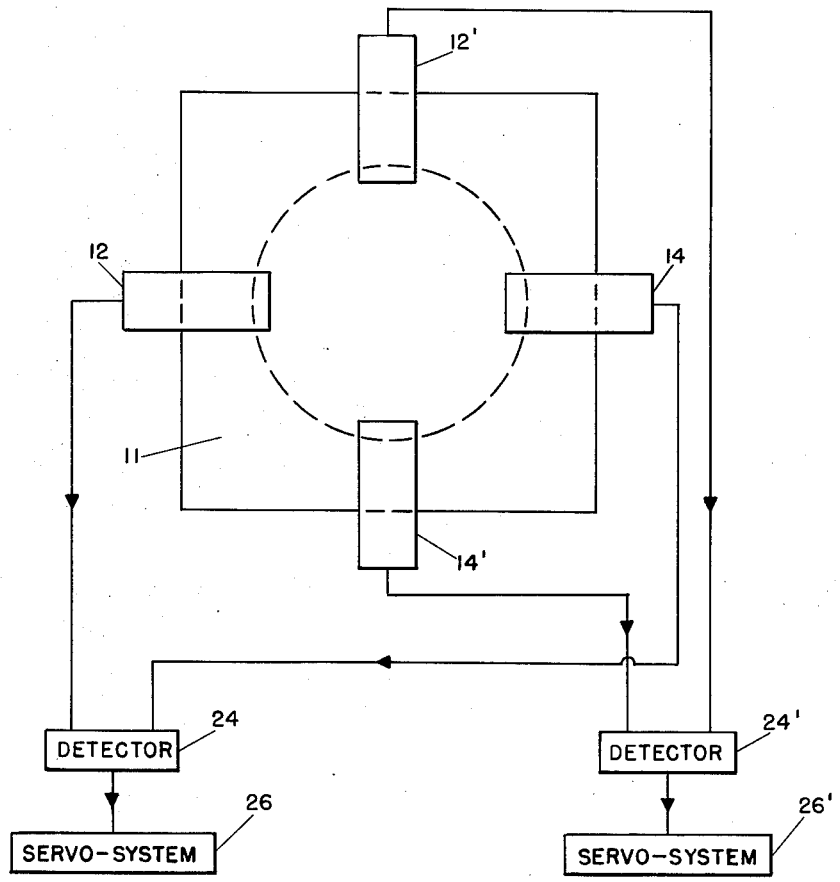
FIG. 9 shows how four tabs are used to give 2-dimensional tracking.

FIG. 9 shows how four tabs are used to give two-dimensional tracking. The transverse voltage developed across tabs 12 and 14 is applied to detector 24. At the same time the transverse voltage developed across tabs 12' and 14' is applied to another detector 24'. The outputs of these two detectors are each applied to servo systems 26 and 27' respectively which reposition the optical element and/or the semiconductor as explained above.

Figure 10:
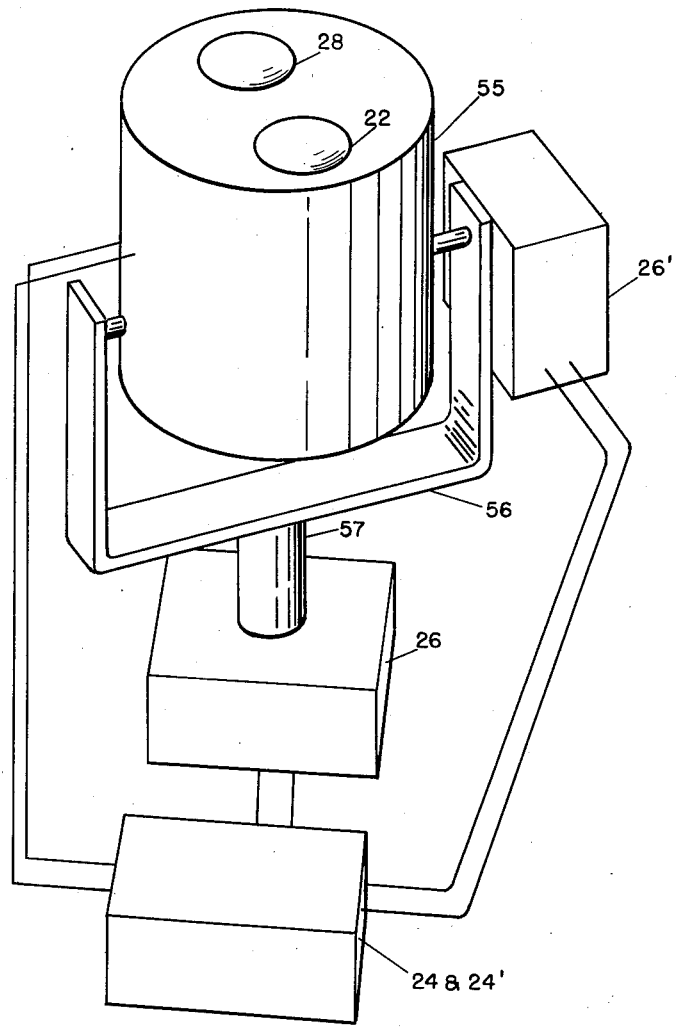
FIG. 10 illustrates an assembly utilizing the device of this invention.

FIG. 10 illustrates an assembly utilizing the device of the instant invention. It this figure the semiconductor (not shown) is mounted in a container 55 in the top surface of which are mounted the two lenses 22 and 28. This container is suitably mounted in a yoke 56 arranged to be rotated about a horizontal axis by elevation servo mechanism 26'. The yoke 56 is affixed to a shaft 57 which is arranged to be supported by and rotated about a vertical axis by azimuth servo mechanism 26. Both servo mechanism 26' and 26 operate under the control of actuating signals from detector 24 and 24' which derive signals from the semiconductor mounted in container 55. Light choppers 38 and 40 (not shown) and their operating mechanisms are also mounted in container 55. All signals to and from rotatable portions are transmitted through suitable slip-rings (not shown).

In operation, the outputs from the four tabs shown in FIG. 9 are applied to detectors 24 and 24' as shown in FIG. 10. Suitable signals are then transmitted to azimuth servo mechanism 26 and elevation servo mechanism 26' to change the bearing of container 55 to keep the outputs from the semiconductor at a minimum, so that the target may be tracked by elevation and azimuth angles derived from servo mechanism 26 and 26'.

While I have described the principles of my invention and shown and discussed embodiments thereof others within the scope of my invention will occur to those in related arts. I desire therefore to be limited not by the foregoing examples, illustrations and explanations, but only by the following claims.

What is claimed is:

1. A range finder comprising a semiconductor having the characteristic that it produces an increased lateral voltage as an image spot moves away from the optical axis or increases in intensity, and produces an increasing transverse current as the image spot increases in intensity, means to image a target upon said semiconductor, means to measure the lateral voltage, means to measure the transverse current, means to obtain the quotient of said measured values, and means to compare successive quotients whereby the effect of intensity increases of said spot is minimized and the range of an object accurately determined.

2. A range finder and tracking device comprising, in combination, a semiconductor having the characteristic that it produces an increased lateral voltage as an image spot moves away from the optical axis and as the image spot-producing intensity increases and having the characteristic that an increase in transverse current is produced as the image spot increases in intensity, means to image a target on said semiconductor, means to measure the two lateral voltages resulting from displacement of the image spot in two directions at right angles to each other, means to measure the transverse currents resulting from changes in incident radiation, means to obtain the quotients of lateral voltages divided by transverse currents in both said directions, and means to compare successive quotients in each said direction whereby the effect of intensity increases of incident radiation is minimized and the direction and range of a target accurately indicated.

3. A range finder and tracking device comprising, in combination, a semiconductor having the characteristic that it produces an increased lateral voltage as an image spot moves away from the optical axis and as the image spot-producing intensity increases and having the characteristic that an increase in transverse current is produced as the image spot increases in intensity, means to image a target on said semiconductor, means to measure the two lateral voltages resulting from displacement of the image spot in two directions at right angles to each other, means to measure the transverse currents resulting from changes in incident radiation, means to obtain the quotients of lateral voltages divided by transverse currents in both said directions, means to compare successive quotients in each said direction whereby the effect of intensity increases of incident radiation is minimized and the direction and range of a target accurately indicated, and servo means to move said semiconductor and imaging means together to center the image on said semiconductor.

References Cited in the file of this patent

UNITED STATES PATENTS

| 2,431,625 | Tolson | Nov. 25, 1947 |
| 2,918,581 | Willey et al. | Dec. 22, 1959 |
| 2,919,350 | Taylor | Dec. 29, 1959 |
| 2,974,230 | Harris | Mar. 7, 1961 |

OTHER REFERENCES

A New Semi-Conductor Photocell Using Lateral Photoeffect, by Wallmark, Proceedings of the I.R.E., April 1957, pages 474 to 483.